(12) United States Patent
Dziekonski

(10) Patent No.: US 12,297,699 B2
(45) Date of Patent: May 13, 2025

(54) VIBRATION DAMPING SUBSEA TUBULAR SYSTEM

(71) Applicant: Mitchell Z. Dziekonski, Stafford, TX (US)

(72) Inventor: Mitchell Z. Dziekonski, Stafford, TX (US)

(73) Assignee: Mitchell Z. Dziekonski, Stafford, TX (US)

( * ) Notice: Subject to any disclaimer, the term of this patent is extended or adjusted under 35 U.S.C. 154(b) by 124 days.

(21) Appl. No.: 17/730,626

(22) Filed: Apr. 27, 2022

(65) Prior Publication Data

US 2022/0356766 A1  Nov. 10, 2022

Related U.S. Application Data

(60) Provisional application No. 63/185,492, filed on May 7, 2021.

(51) Int. Cl.
  *F16L 55/04* (2006.01)
  *B63B 22/02* (2006.01)
  *E21B 17/01* (2006.01)

(52) U.S. Cl.
  CPC .......... *E21B 17/015* (2013.01); *B63B 22/021* (2013.01); *F16L 55/04* (2013.01); *F16L 55/041* (2013.01)

(58) Field of Classification Search
  CPC .......... E21B 17/01; E21B 17/015; F16L 1/20; F16L 1/123; F16L 55/04; F16L 55/041
  USPC ...................................... 405/211, 211.1, 216
  See application file for complete search history.

(56) References Cited

U.S. PATENT DOCUMENTS

| | | | | |
|---|---|---|---|---|
| 6,364,039 B1* | 4/2002 | Majkovic | .............. | E21B 17/073 175/320 |
| 7,004,681 B2* | 2/2006 | Penza | ....................... | E03F 3/06 405/184.2 |
| 7,513,209 B2* | 4/2009 | Masters | ................... | E21B 17/01 114/243 |
| 8,056,935 B2* | 11/2011 | Gustafson | ............... | E21B 17/01 285/222.1 |
| 8,152,414 B2* | 4/2012 | Brown | .................... | E21B 17/01 405/211 |
| 8,387,707 B2* | 3/2013 | Adamek | ............... | E21B 17/085 166/346 |

(Continued)

FOREIGN PATENT DOCUMENTS

CN  109854386 A  *  6/2019  ......... F02M 37/0041

OTHER PUBLICATIONS

Brown, C.F. et al; "The use of aluminum drill pipe for damping drill string vibrations," Society of Petroleum Engineers, 2018, 2 pages.

(Continued)

*Primary Examiner* — Frederick L Lagman
(74) *Attorney, Agent, or Firm* — Fletcher Yoder, P.C.

(57) ABSTRACT

A subsea tubular system comprises extended sections of a first material and interposed sections of a second, different material that aids in damping vibration resulting from subsea dynamic conditions such as current. The vibration damping sections may make up a portion of the overall system significantly less than the sections of the first material. The number, length, and positions of the vibration damping sections may be selected based on factors such as the diameter, overall length, profile, and so forth. The system may be used as a riser or other conduit for the production of minerals such as oil and gas.

18 Claims, 3 Drawing Sheets

(56) References Cited

U.S. PATENT DOCUMENTS

| | | | | |
|---|---|---|---|---|
| 8,562,256 | B2* | 10/2013 | Li | B63B 27/24 |
| | | | | 405/224.2 |
| 8,579,546 | B2* | 11/2013 | Masters | B29C 45/14622 |
| | | | | 405/216 |
| 8,783,362 | B2* | 7/2014 | Adamek | E21B 17/07 |
| | | | | 166/346 |
| 8,888,411 | B2* | 11/2014 | Wajnikonis | F16F 7/10 |
| | | | | 405/211 |
| 9,033,614 | B2* | 5/2015 | Yuan | F16L 1/24 |
| | | | | 405/169 |
| 10,844,672 | B2* | 11/2020 | Dziekonski | E21B 28/00 |
| 2002/0168232 | A1* | 11/2002 | Xu | E21B 17/01 |
| | | | | 405/224 |
| 2006/0280559 | A1* | 12/2006 | Allen | E02D 27/52 |
| | | | | 405/216 |
| 2008/0087351 | A1 | 4/2008 | Paulshus et al. | |
| 2008/0253842 | A1* | 10/2008 | Wolbers | F16L 1/20 |
| | | | | 138/92 |
| 2011/0259463 | A1* | 10/2011 | Song | F16L 1/20 |
| | | | | 138/172 |
| 2013/0263964 | A1 | 10/2013 | Jones et al. | |
| 2018/0155994 | A1 | 6/2018 | Wajnikonis | |
| 2018/0230759 | A1* | 8/2018 | Brooks | F16L 55/04 |
| 2018/0334863 | A1 | 11/2018 | Dziekonski | |

OTHER PUBLICATIONS

Extended European Search Report for Application No. 22172053.5 mailed Sep. 30, 2022, 8 pages.

Second Examination Report for Australian Patent Application No. 2022203047 mailed May 8, 2024, 4 pages.

* cited by examiner

VIBRATION DAMPING SUBSEA TUBULAR SYSTEM

CROSS-REFERENCE TO RELATED APPLICATIONS

This application claims priority from and the benefit of U.S. Provisional Application Ser. No. 63/185,492, entitled "Vibration Damping Subsea Tubular System," filed May 7, 2021, which is hereby incorporated by reference in its entirety.

BACKGROUND

The invention relates to subsea tubular systems, such as risers, flowlines, jumpers, and the like, and particularly to systems that permit damping in vibrations of extended sections of tubulars under the influences of subsea currents.

In the field of subsea mineral production, a wide range of mechanical equipment and associated flow conduits are known and in use. Where a well or production location is on (or below) the sea floor, extracted materials need to be transported to a location where they can be collected and processed. In many oil and gas wells, for example, this is done by an extended conduit that is connected at one end to subsea well equipment on the sea floor to a floating or standing vessel or installation at the other. Such conduits are commonly referred to as risers, though parts of them may be known by other terms, such as jumpers. Such risers may, in turn, take many forms depending upon such factors as the well location, the depth of water, the nature of the connected vessel, and so forth. Other conduits may connect different well equipment on the sea floor, and such conduits are sometimes referred to as flowlines or jumpers.

Moreover, though more known in the field of oil and gas exploration and production, such tubular systems are increasingly considered for subsea mining applications. In such cases, minerals lying on or near the sea floor may be collected and moved through the systems to a collection and processing point, which may again be a floating or standing vessel or installation.

Further, tubular systems of these types may serve different purposes during different phases of operation. For well applications, for example, risers or similar systems may be used during subsea drilling. After well completion, a production riser system is then installed, and used for transporting produced flows from the well to the collection and processing point. The present disclosure is primarily concerned with such production systems.

The mechanical dynamics of subsea tubular systems is complex, and often difficult or even impossible to accurately predict. That is, for example, rises may take on different shapes or profiles as they extend from one end to the other, and the shape may change over time owing, for example, to movement of the vessel, weather systems, stresses on the system, and so forth. Particularly problematical are subsea currents that may not only displace riser, in this example, but the velocity of which may correspond to one or more resonant frequencies of the riser. It has been found that naturally occurring currents, such as loop currents, may be very considerable, in some cases not being apparent from surface conditions. Due to the difficulty in anticipating or modeling such conditions, it is common in the field to "overbuild" risers by using tubulars made of a heavy steel alloys along their entire length. The resulting systems are both heavy and may still not always resist the considerable stresses seen during periods of their useful life. Where currents cause significant vibration, this may actually significantly reduce their life, and even threaten failure.

The present disclosure offers a unique and novel approach to the construction of subsea tubular systems that can alter their dynamic properties, particularly those related to vibration.

BRIEF DESCRIPTION

In accordance with certain aspects of the present disclosure, a subsea tubular system comprises a plurality of tubular sections made of a first material and joined end-to-end to form a flow path for liquids from a subsea well, and a plurality of vibration damping tubular sections made of a second material different from the first material interposed between the tubular sections to form part of the flow path. The second material has mechanical properties that damp vibration of the tubular system when subjected to underwater currents. And though reference is made to wells and to oil and/or gas production, the invention may be used for any desired subsea application, such as mining.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present disclosure sets forth embodiments of subsea tubular systems that include features that reduce, attenuate, or damp vibrations and/or oscillations owing to dynamic conditions such as internal fluid flow and subsea currents. In particular, the embodiments comprise one or more sections of a vibration damping material that alters the dynamic behavior of the overall system, such as to reduce, eliminate, or change resonant frequencies as a function of subsea currents. In the embodiments contemplated, the rest of the system may be made in conventional ways, and from conventional materials. However, because the vibration damping sections may significantly reduce loading and stresses due to vibration and movement, the rest of the system may actually be made of less costly and even lighter materials (e.g., steel sections with thinner walls than in conventional systems of the same length and application).

Further, the applications contemplated include any installation where a tubular structure is extended to a subsea point and exposed to vibration-inducing currents. These may include oil and gas production, subsea mining, and so forth. The techniques disclosed will find particular utility where significant currents occur or can occur, both in predictable ways, and at times unpredictable or somewhat unknown, and at various depths. Such currents may be associated with gyres, known steady streams (e.g., the Gulf Stream), unique and transitory weather patterns, loop currents, and so forth. By way of example, in the Gulf of Mexico, water from the Florida Current meets water from the Caribbean Sea to form the Gulf Loop Current. Such currents may be quite variable and even unpredictable, and may move or drift over time, both in their locations and their depths. The velocity of the currents may also vary greatly, such as between a few miles per hour to much higher velocities in eddies that may form.

Figure 1:
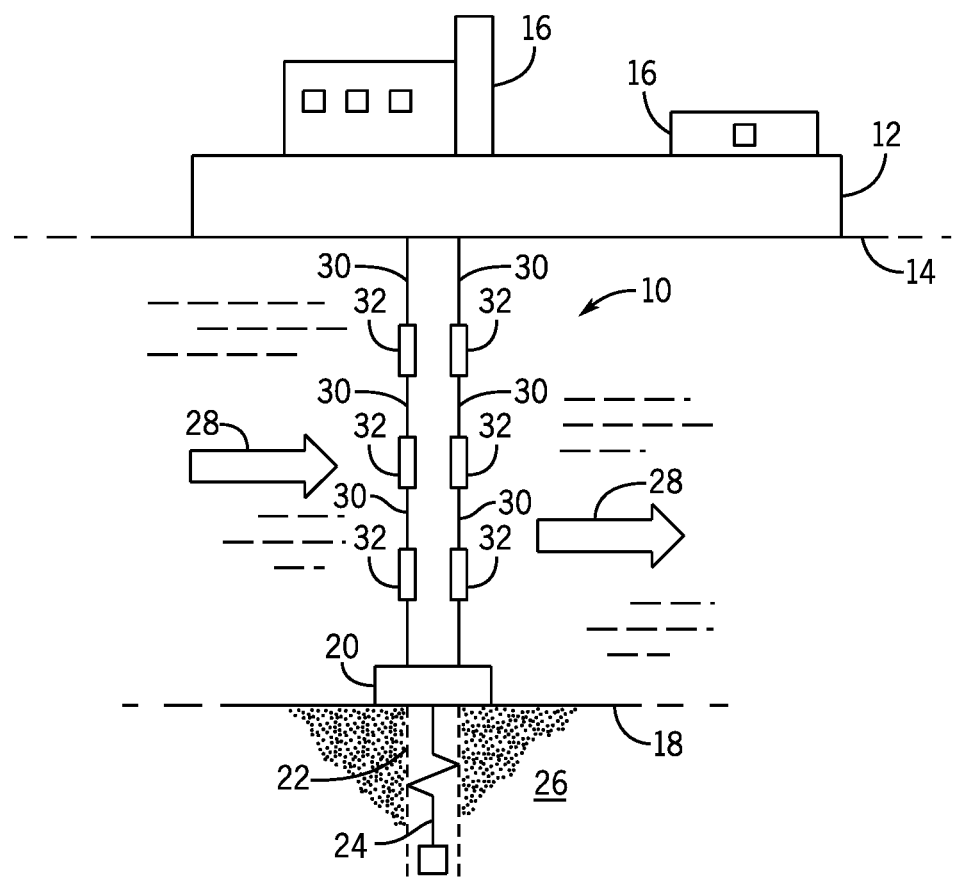
FIG. 1 is a diagrammatical illustration of an exemplary subsea riser system for damping vibration, in this case used for production of well products from a subsea location.

In the embodiment illustrated in FIG. 1, a vibration damping tubular system 10 is shown extending from a vessel 12 on the surface 14 of a body of water, such as an ocean or gulf. The vessel may include various installations and equipment, as indicated by reference numeral 16, such as control and monitoring equipment, production collection equipment, maintenance and support equipment, living quarters, and so forth. It should be noted that, although the present disclosure makes reference to a "vessel", this should be understood to include ships, platforms, both fixed and floating, moored vessels and platforms, dynamically positioned ships and platforms, and so forth.

The system 10 extends to the sea floor 18 at an opposite end. In this example, the system 10 comprises a production riser that transports produced minerals (e.g., oil and/or gas) from subsea equipment 20 (e.g., wellhead components) that top a completed well 22. As appreciated by those skilled in the art, the well is completed with a production casing 24 that traverses horizons of interest 26 from which minerals are produced.

In practice, one or many such risers may be installed between the vessel and one or many locations on the sea floor where wells have been completed. Such locations are generally somewhat clustered, but may lie at considerable distances from one another. Further, the depth of water in which such installations may be made may vary greatly, such as between 500 and 15,000 feet in depth. Still further, the vessel may be located or maintained over the well location by mooring lines (not shown) or may be dynamically positioned. In either case, however, the vessel will typically be located at some distance laterally from the well location(s) and may move with respect to the location(s) under the influence of currents, surface conditions, and so forth.

As illustrated in FIG. 1, subsea currents 28 will flow at different depths and influence the position and behavior of the system 10. As discussed above, such currents may vary in velocity and depth over time, and in many applications their precise dynamics will not be known apriori. The effect of such currents on the system 10 will, consequently, vary over time, and at points along its length.

In the illustrated embodiment, the system 10 comprises relatively long sections 30 made of a conventional material, such as steel. These may be joined end-to-end in conventional manners, such as via threaded connections or welding. However, unlike conventional systems, vibration damping sections 32 are provided along the length of the system 10 that alter the dynamics in response to currents 28 at different times and depths. It is presently contemplated that in an oil and gas riser, for example, one, two, three, or more such sections may be provided at different depths, three being shown in FIG. 1 by way of example. It is also contemplated that the portion of the overall length of the system that will comprise the vibration damping sections will be relatively small as compared to the portion made up of conventional tubular products. It should be noted, however, that where vibration and associated loading can be significantly reduced, the conventional materials may be lighter, with thinner wall thicknesses than conventionally used in such applications, allowing for savings in cost and weight.

Figure 2:
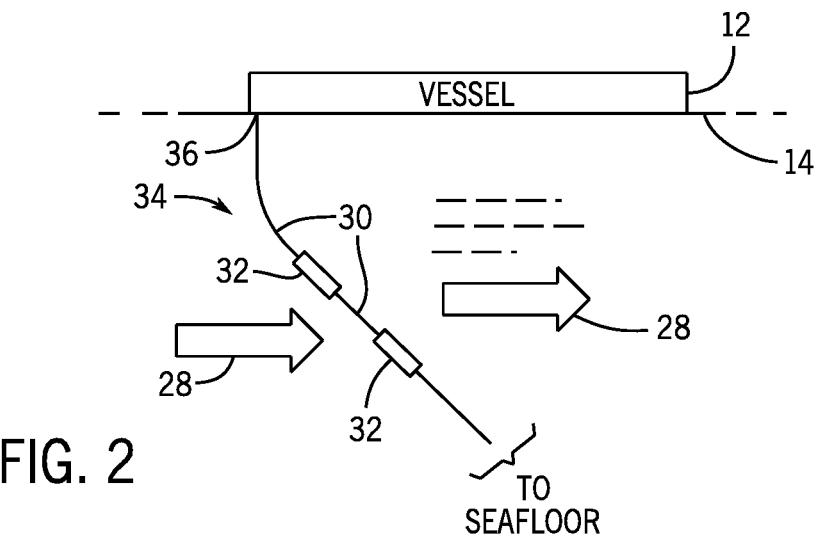
FIG. 2 is a diagrammatical illustration of an exemplary vibration damping subsea riser system in the form of a tieback riser.

FIG. 2 shows a similar installation of the disclosed system, in this case in the form of a tieback riser 34. Such risers may be attached to the vessel 12 at a tieback point 36. Such risers may comprise generally rigid pipe used with fixed or stable floating platforms. Here again, the riser 34 includes sections 32 designed to damp vibration at one or more point along its length.

Figure 3:
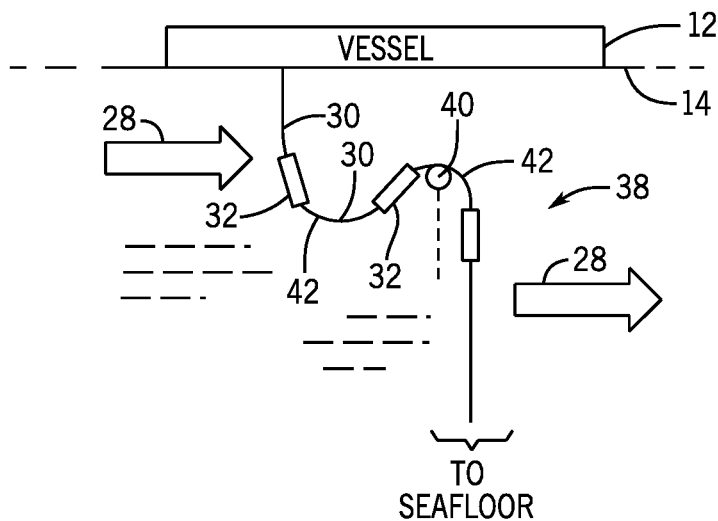
FIG. 3 is a diagrammatical illustration of an exemplary vibration damping subsea riser system in the form of a buoy-supported catenary riser.

FIG. 3 shows another exemplary arrangement in which a catenary riser 38. Such risers may extend in a generally catenary profile to the sea floor, or in some cases may be partially supported by one or more buoys or floaters 40, resulting in curved sections 42. Such risers may extend over very considerable length both with respect to the distance from the subsea attachment location and the depth of water. As in the previous embodiments, the riser 38 comprises vibration damping sections 32 along its length. Where curved sections 42 result from buoys or floaters, the damping sections 32 may be provided above, below, or both above and below such devices.

Figure 4:
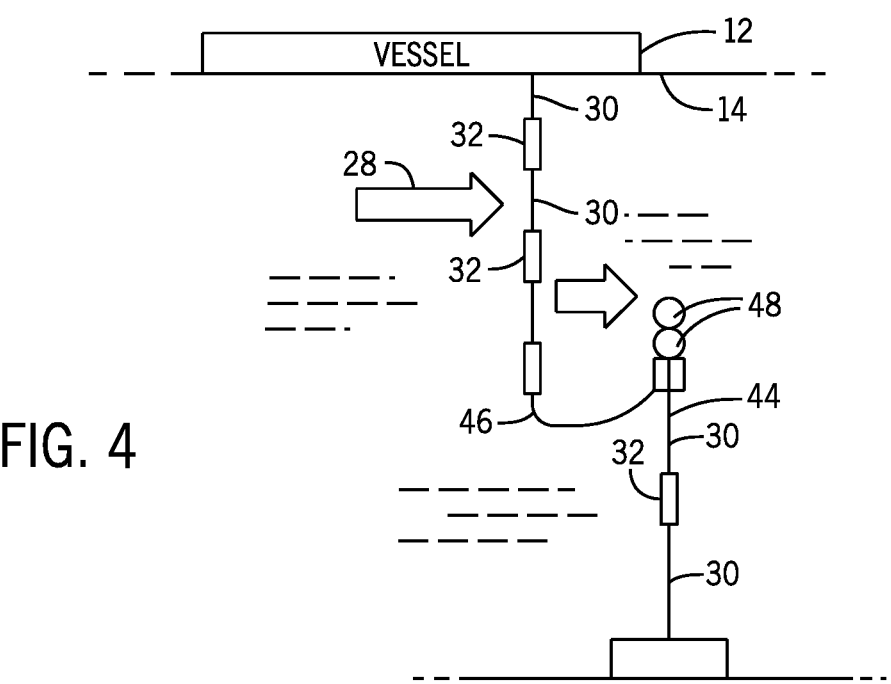
FIG. 4 is a diagrammatical illustration of an exemplary vibration damping subsea riser system comprising a flexible riser and a jumper.

FIG. 4 illustrates a further embodiment in which the tubular system comprises a flexible riser 44 and a jumper 46. The flexible riser 44 may be maintained in a generally upright position by buoys or floaters 48. Here again, vibration damping sections 32 are provided, and in systems such as that of FIG. 4, these sections may be included in the flexible riser 44, the jumper 46, or both.

Figure 5:
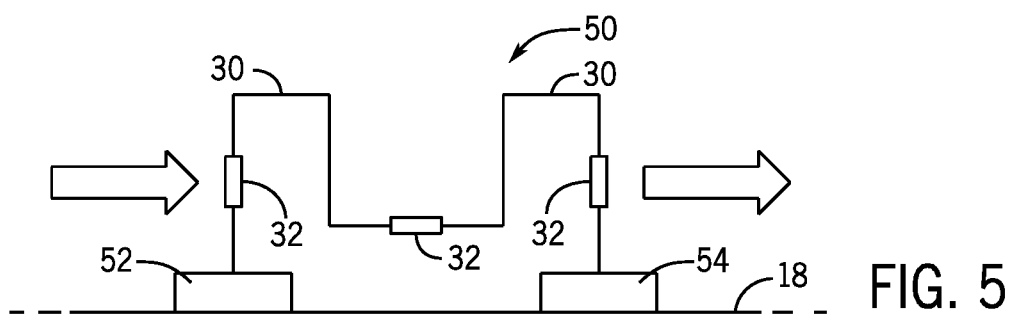
FIG. 5 is a diagrammatical illustration of an exemplary vibration damping subsea tubular system between two subsea locations or wells.

Finally, FIG. 5 illustrates a somewhat different application in the form of a flowline or jumper 50 that may extend between two locations 52 and 54 of subsea equipment. Such equipment may include well head components, such as manifolds, connectors, valves and so forth. Such jumpers may be prefabricated and lowered into place for connection, and may include somewhat circuitous paths, such as shown in the figure. However, in general, some portion of the flowline may be exposed to currents, and such lengths may be equipped with one or more vibration damping sections 32.

Figure 6:
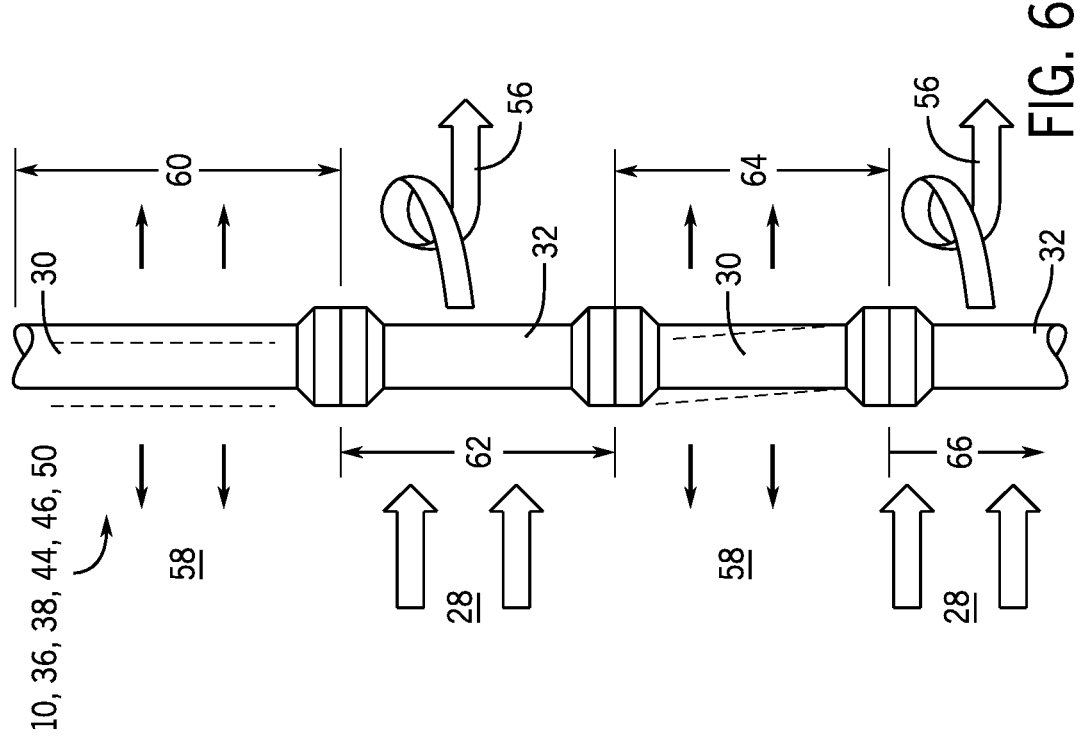
FIG. 6 is a diagrammatical illustration of certain construction details of an exemplary vibration damping subsea tubular system.

As noted, many different physical configurations may be envisaged for incorporating the vibration damping tubular sections in the overall system, and one such exemplary arrangement is shown in FIG. 6. In general, the tubular sections making up the majority of the length of the system will be made first material and joined end-to-end to form a flow path for liquids from a subsea location. Vibration damping sections will be interposed between the tubular sections and form part of the flow path. The material of the vibration damping tubular sections is different from the first material, and their geometry, physical dimensions, or other mechanical designs are such as to alter the overall dynamic characteristics of the system as compared to conventional systems of the same overall length made of only the first material, particularly in response to underwater currents.

In the illustrated embodiment, the system includes sections or lengths 30 of the first material, such as steel, and interposed sections or lengths 32 of the vibration damping material, such as titanium or nickel alloys. In practice, the sections 30 may comprise many joints of standard tubular products (e.g., pipe) that are joined by conventional threaded connections, welding, and so forth. Similarly, the interposed sections 32 may comprise one or more joints of the vibration damping tubular material. The latter may be standard lengths, such as between 30 and 45 feet in length, or could comprise a number of standard or purpose-designed lengths joined to one another by threaded connections, couplings, weld joints, and so forth. Moreover, connections between the sections 30 and the vibration damping sections 32 may be made by conventional or special purpose threaded ends, weld joints, and so forth. It may also be noted that while conventional sections 30 may comprise steel tubulars having wall thicknesses of between ¼ inch and 1 inch, where the disclosed system allows for sufficient reduction in loading from vibration, lighter tubulars may be used, such as with wall thicknesses of between 25% to 40% or more below the conventional designs.

In use, currents 28 may form eddies 56 as the currents pass the system. Of course, the velocities of these will vary depending upon such factors as the persistent and transient currents (e.g., at different depths), the flow of produced materials through the tubular system, the impingement face presented to the currents, and so forth. Owing to flow dynamics such as vortex shedding, these currents 28 and eddies 56 may result in generally lateral movement as indicated generally by reference numeral 58, which may vary in frequency, constituting a "vibration" as used in the present context. The materials, lengths, and other mechanical properties of the system, and particularly the vibration damping tubular sections 32 aid in reducing this movement and vibration.

In some cases, the geometries, dimensions, and designs of the vibration damping sections 32 may include not only standard sizes and lengths, but other features that aid in changing the dynamics of the system and damping vibration. For example, an upper length 60 between the vessel and the first damping section 32 may be on the order of 150 feet or deeper into the sea, while the length 62 of the first vibration damping section may comprise, for example, 1 to 3 (or more) joints of 20-40 foot. tubulars. Subsequent sections 30 may have lengths 64 of hundreds to thousands of feet, depending upon the design, while subsequent damping sections may have lengths 66 similar to length 62. It should be noted, however, that these lengths may differ between applications based on the anticipated or estimated conditions, overall lengths of the overall system, overall shapes and sizes of the tubulars and any joints, and so forth.

As noted above, presently contemplated materials include titanium alloys and high nickel alloys. By way of example, other materials may include aluminum alloys. Exemplary internal diameters may be between 3 inches to 16 inches, with wall thicknesses between ⅜ inch to 1½ inches. It is contemplated that material and mechanical properties such as the mechanical design and profile, the density and the modulus of elasticity will cause the sections 32 to behave substantially differently than sections 30 in comparable conditions, and will lend the overall structure significantly different performance, damping movement and vibration. Further, design features such as wall thickness tapers may also be used for the vibration damping sections. Still further, as noted above, any desired number of such sections may be included in the overall system, and these may be placed at locations and spacings suitable for the application, such as in lengths of tens of feet, interposed between conventional sections of hundreds or thousands in length.

Figure 7:
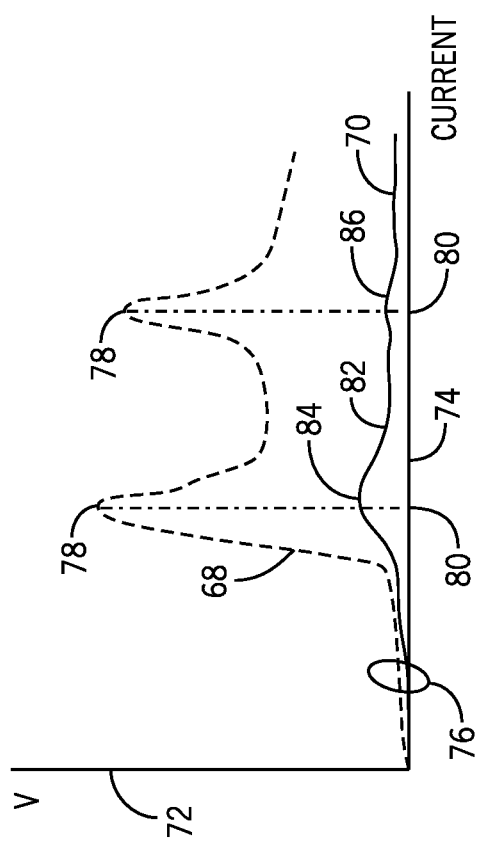
FIG. 7 is a graphical representation of vibration profiles of a conventional riser system and the disclosed vibration damping system as a function of subsea current velocity.

FIG. 7 illustrates graphically an exemplary comparison between vibration or frequency response of a conventional riser and the presently contemplated system. Here, a trace 68 is shown for a conventional system, while a trace 70 is shown for the present system, with vibration being represented along axis 72, and current along axis 74. At very low currents 76, both systems may experience little movement or vibration. As currents increase, however, more significant vibrations may be induced in the conventional system, and resonant frequencies of induced movement may result in significant peaks 78 at corresponding currents 80. In practice, these may be difficult or impossible to precisely anticipate, and they may occur at different depths. It is contemplated, however, that the effect of use of the "hybrid" vibration damping system comprising both conventional sections and vibration damping sections will result in both attenuated vibration, as indicated by reference numeral 80, and significantly reduced peaks 84. In many applications it can be envisioned that the resonant frequencies themselves may be significantly different or eliminated altogether.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A subsea tubular system comprising:
   a plurality of tubular sections made of steel and joined end-to-end to form a flow path for liquids from a subsea well;
   a plurality of vibration damping tubular sections made of a titanium alloy interposed between the tubular sections to form part of the flow path;
   wherein titanium alloy has mechanical properties that damp vibration of the tubular system when subjected to underwater currents; and
   wherein the tubular sections have a first wall thickness and the vibration damping tubular sections have a second wall thickness different from the first wall thickness.

2. The system of claim 1, wherein the tubular sections and vibration damping tubular sections form a production riser extending from a surface vessel and a subsea well location.

3. The system of claim 2, comprising a plurality of titanium alloy vibration dampening tubular sections separated from one another by steel tubular sections.

4. The system of claim 2, wherein the production riser comprises a catenary riser wherein at least a part of the production riser is supported by buoys.

5. The system of claim 2, wherein the production riser comprises a flexible riser and a jumper, and wherein vibration damping tubular sections are interposed in both the flexible riser and the jumper.

6. The system of claim 2, wherein the riser has a length of between approximately 500 and 15,000 feet.

7. The system of claim 1, wherein the tubular sections and vibration damping tubular sections form a flowline or jumper between two different subsea well locations.

8. The system of claim 1, wherein a first tubular section extends at least 150 feet below a vessel, in operation, and a first vibration damping tubular section extends from the first tubular section at least 20 to 120 feet.

9. The system of claim 1, wherein at least one of the vibration damping tubular sections has a tapered diameter along its length.

10. The system of claim 1, wherein the vibration damping tubular sections have a length of between approximately 30 and 45 feet.

11. A subsea riser system comprising:
a plurality of steel tubular sections joined end-to-end to form a flow path for liquids from a subsea well;
a plurality of titanium alloy vibration damping tubular sections interposed between the tubular sections to form part of the flow path;
wherein the steel tubular sections have a first wall thickness and the titanium alloy vibration damping tubular sections have a second wall thickness different from the first wall thickness.

12. The subsea riser system of claim 11, comprising a flexible riser and a jumper, and wherein vibration damping tubular sections are interposed in both the flexible riser and the jumper.

13. The subsea riser system of claim 11, wherein the steel tubular sections and the vibration damping tubular section form a flowline or jumper between two different subsea well locations.

14. The subsea riser system of claim 11, wherein a first tubular section extends at least 150 feet below a vessel, in operation, and a first vibration damping tubular section extends from the first tubular section at least 20 to 120 feet.

15. A method for reducing vibration in a subsea riser system comprising:
connecting a plurality of steel tubular sections end-to-end to form a flow path for liquids from a subsea well;
connecting a plurality of titanium alloy vibration damping tubular sections interposed between the tubular sections to form part of the flow path;
wherein the steel tubular sections and the titanium alloy vibration dampening tubular sections reduce vibration in from subsea currents based on density and modulus of elasticity of the titanium alloy vibration dampening tubular sections; and
wherein the steel tubular sections have a first wall thickness and the titanium alloy vibration damping tubular sections have a second wall thickness different from the first wall thickness.

16. The method of claim 15, wherein the subsea riser system comprises a flexible riser and a jumper, and wherein the vibration damping tubular sections are interposed in both the flexible riser and the jumper.

17. The method of claim 15, wherein the steel tubular sections and the vibration damping tubular sections form a flowline or jumper between two different subsea well locations.

18. The method of claim 15, wherein a first tubular section extends at least 150 feet below a vessel, in operation, and a first vibration damping tubular section extends from first tubular section at least 20 to 120 feet.

* * * * *